United States Patent Office 2,758,618
Patented Aug. 14, 1956

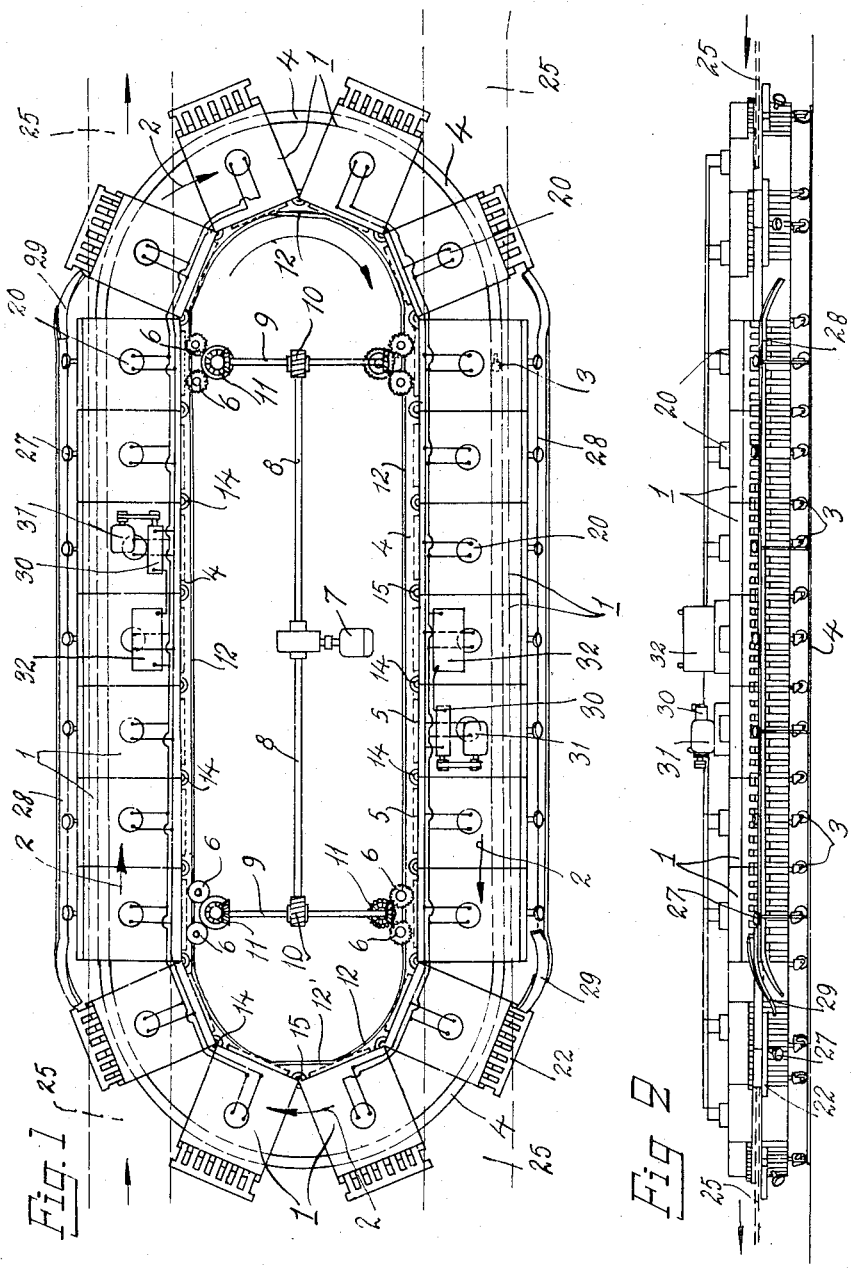

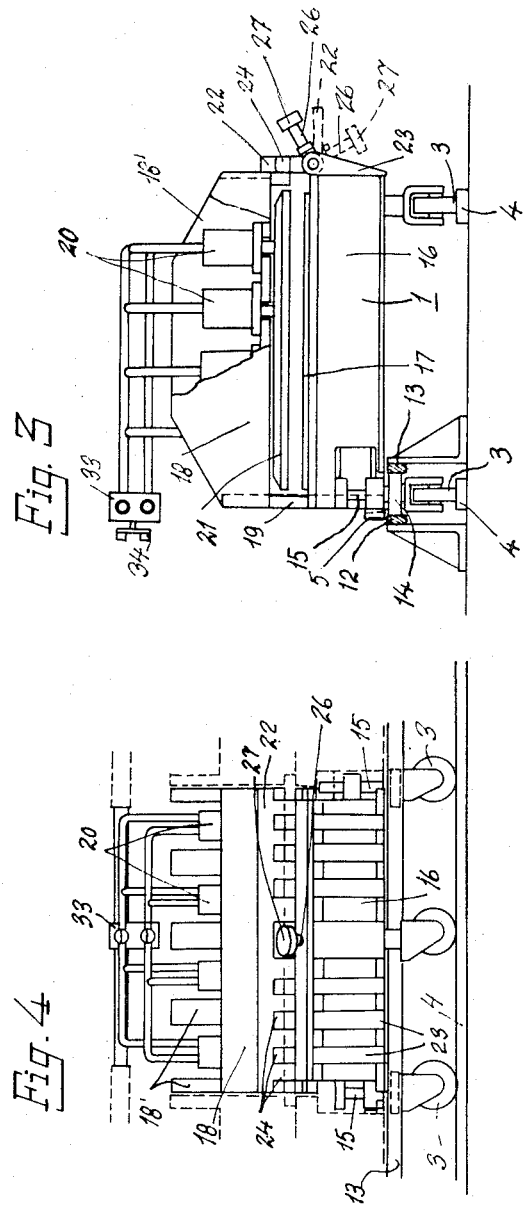

2,758,618

PANEL PRESSES

Knut Lennart Bergvall, Ernst Erik Dahlberg, Bengt Gunnar Wilhelm Egerström, and Rune Nilsson, Stockholm, Sweden, assignors to Aktiebolaget Bostadsforskning, Stockholm, Sweden, a joint-stock company of Sweden Application November 15, 1954, Serial No. 468,954

4 Claims. (Cl. 144—281)

It is known already to make continuously operating presses, for example for the manufacture of plywood or like panels, in the form of a plurality of carriages interconnected to form an endless train, which is advanced along a closed path that is straight at least for a part of its length, so that, during the travel along that straight part of the path, the carriages run right behind one another, each of the carriages being equipped with at least one pair of co-operating compression plates which are pressed together as the carriages move along the straight part of the path, thereby to compress a work-piece fed between the compression plates in line with the straight part of the path, such as a continuous, multiply strip of glue-covered veneer or the like, and the compression plates being parted again immediately before the related carriage leaves the straight part of the path so that the pressed work piece is free to continue its own way.

A press of the above type is disclosed for instance in the U. S. Patent No. 2,631,622, but the conveyor press shown therein has its limitations, as it is difficult to obtain high working pressures between the compression plates of the individual carriages, especially when treating wide work pieces.

This invention has for its object to improve the above mentioned type of continuously operating presses and to provide a press capable of applying high working pressures to wide work pieces while avoiding the undue complication of the construction of the press and particularly of the single press carriages. The main feature of the invention is the provision on each carriage of a stirrup-shaped, rigid carrying structure, opening in the direction outwards from the center of the closed path and within which the two compression plates are arranged with each stirrup shank carrying a related one of the plates, the free shank ends of the carrying structure having lock means extending therebetween and serving to temporarily interlock them as long as the compression plates are pressed together to compress the work piece, guide means being provided along the straight part of the path to actuate these lock means.

Further features of the invention will appear from the following description of an embodiment thereof, which refers to the accompanying drawings, wherein:

Fig. 1 is a diagrammatical plan view of a press arranged according to the invention, Fig. 2 is an elevation view of the same press, Fig. 3 is an elevation view, partly broken away, of a press carriage on an enlarged scale as viewed in the direction of movement, and Fig. 4 is a side elevation view of the same carriage as viewed from the outside of the press path.

The continuously operating press illustrated in the drawings comprises a plurality of carriages 1 that are coupled together to form an endless train and are advanced along a closed path 2 consisting of two straight stretches parallelling one another, where the carriages run one straight behind the other, and two 180° curves, along which the carriages 1 travel in fan formation. Each carriage 1 is supported by a number of caster wheels 3 running on runways 4 on the base carrying the press.

Each one of the illustrated carriages 1 is provided with a rack 5 on the side facing the path center, and at certain locations along the path 2 this rack is engaged with gears 6 provided in pairs along the path. A synchronous rotary movement is imparted to the gears 6 from a driving motor 7 via a suitable transmission system 8, 9, 10 and 11 in order to advance the endless train of carriages along the path at a uniform, low speed.

The moving carriages are guided by stationary side ribs 12 and 13 (Fig. 3) provided on either side of horizontal guide pulleys 14, which are rotatable about vertical pivots 15. These pivots 15 serve both to hingedly connect adjacent carriages to one another and as mountings for those supporting wheels 3 of the carriages which are located nearest the center of the path 2. The inner guide rib 12 should preferably extend all around the path 2, but should then be arranged so as to allow the carriages a certain freedom of movement in the curves, for instance by being retracted in these places as at 12'.

The driving of the endless train as well as the guiding of the individual carriages, particularly along the straight parts of the path, may of course also be effected in other ways than herein described and shown.

Each press carriage 1 is provided with a stirrup-shaped (as viewed in the direction of advance), rigid carrying structure, which is open in the direction outwards from the center of the path 2. The lower shank 16 of this structure constitutes a kind of carriage chassis, from which the supporting wheels 3 are suspended and which carries a lower, fixed pressing plate 17. At some distance above the lower shank 16 the other, upper shank 18 is mounted in such a way that it extends over substantially the entire lower shank 16, and the shanks 16 and 18 are rigidly interconnected on the inside of the carriage by means of a stirrup web 19.

The upper shank 18 includes solid beams extending in the direction of movement of the carriage and reinforcing arches 18' extending laterally between such beams and, between which, there are provided a number of co-operating hydraulic jacks 20 of double acting type. The jacks 20 carry an upper, movable compression plate 21 that is placed directly above the lower compression plate 17 and can be pressed against the latter under heavy pressure by means of the jacks. Of course the number of jacks may be varied as desired.

Both compression plates 17 and 21 are so arranged within the rigid stirrup-shaped carrying structure constituted by the members 16, 18 and 19 that the outer, free ends of the stirrup shanks 16 and 18 protrude beyond the compression plates. The lower shank 16 is provided with a vertically swingable locking gate 22 extending along the longitudinal, free edge thereof, said gate being hinged to lugs 23 on the lower shank 16 in such a way as to be located entirely below the top level of the lower compression plate 17 in swung-down position (indicated by broken lines in Fig. 3) and to be practically vertical in swung-up position (shown by full lines in Fig. 3), co-operating in the latter position with a number of pins 24 protruding from the upper shank 18 to effect an interlocking of the two shanks. Thus, when the locking gate is swung down the carriage 1 can swing from a curved stretch of the path 2 to a straight stretch, the compression plates 17 and 21 simultaneously being pushed more or less laterally in, below and above, respectively, a work piece 25 having the form of a continuous material strip, which is fed to the press at a suitable height and in line with the straight part or stretch of the carriage path (Fig. 1). Of course each straight path stretch can be used as a working stretch, as is also indicated in Fig. 1.

The locking gate 22 is operated by means of an arm 26 that is rigidly connected to the gate and is provided at its outer end with a guide roller 27, which is actuated by stationary guide rails 28, 29 arranged at least along the straight stretches of the path 2. These guide rails ensure that the locking gate 22 of each carriage 1 is caused to assume the locking position and is retained in this position as long as the compression plates 17 and 21 are operated to compress the work piece 25, and is then swung down again when the hydraulic pressure ceases, so that the work piece can continue its own straight path, even though the carriage swings away from that straight path at the end of the straight part of the carriage path.

By reason of this utilization of the locking gate 22 the carriage design is considerably simplified, as thereby the stirrup-shaped carrying structure no longer needs to have sufficient strength itself to resist the entire reaction pressure from the jacks. Instead this pressure is divided so that both the locking gate and the stirrup web 19 are subjected only to tension stresses throughout the pressing operation.

As diagrammatically illustrated in Figs. 1 and 2 the hydraulic jacks 20 of the different carriages 1 are connected to an oil pump 30 driven by an electric motor 31 mounted on top of one of the carriages 1 and thus partaking in the movement of the train. An adjacent carriage carries an oil reservoir 32. The driving motor 31 receives current through sliding contacts or the like (not shown in the drawing). To avoid unnecessary large pump outfits and pipe resistance, the carriages of the train are divided into suitable, interconnected groups, with a pump outfit for the jacks of each group as indicated in Fig. 1. Of course the oil conduits between the carriages 1 are flexible.

As is most easily seen from Figs. 3 and 4 the jacks 20 of each carriage are connected to a valve housing 33 mounted on the carriage. This valve housing contains a reversing valve with operating means 34, for reversing the oil flow from the pump outfit so that in one position of the valve the compression plates are forced towards one another and in another position of the valve they are pulled apart. The operating means 34 on each carriage is influenced by actuating means (not shown in the drawing), which are provided along the path 2 in such places that the hydraulic pressure forcing the compression plates together is admitted only after the carriage has entered the straight path stretch and the locking gate has closed, and ceases before the locking gate opens again and the carriage enters the curve.

We claim:

1. In a conveyor press for the continuous production of composite panels and the like, the combination of a closed race having straight stretches, a plurality of carriages interconnected to form an endless train, means for advancing said train along said race, on each of said carriages a stirrup-shaped carrying structure having relatively long vertically spaced apart, horizontal shanks rigidly connected together near the side of the carriage facing the center of said closed race, a fixed compression plate mounted on one of said shanks, a vertically movable compression plate mounted on the other one of said shanks and facing said first-mentioned compression plate, jack means for pressing said movable plate towards said fixed plate, lock means at the outer ends of said shanks movable to an operative position extending between said outer ends where said lock means prevents spreading apart of said shanks and forms, with said carrying structure, a closed frame for said compression plates, actuating means along said straight stretches of said race to cause said lock means to move to said operative position, and control means for effecting actuation of said jack means only when said lock means is in said operative position.

2. In a conveyor press the combination as claimed in claim 1, wherein said jack means are hydraulically operated and wherein said control means include a fluid flow reversing valve on each carriage and means along said straight stretches of said race for actuating said valve.

3. In a conveyor press for the continuous production of composite panels and the like; the combination of a closed race having straight stretches, a plurality of carriages interconnected to form an endless train, means for advancing said train along said race, a stirrup-shaped carrying structure on each of said carriages, each carrying structure having vertically spaced apart, horizontal shanks rigidly connected together near the side of the carriage facing the center of said closed race, a fixed compression plate mounted on one of said shanks, a vertically movable compression plate mounted on the other of said shanks and facing said fixed compression plate, jack means for pressing said movable plate towards said fixed plate, a vertically swingable locking gate on the outer end of one of said shanks, projections on the other of said shanks engageable by said locking gate and then cooperating with the latter to prevent spreading apart of said outer ends of the shanks, an operating arm on said gate, guide rails along said straight stretches of said race and there engaging said operating arm to swing the related locking gate into and out of engagement with the associated projections, and control means for effecting actuation of said jack means only when said locking gate engages the related projections.

4. In a conveyor press for the continuous production of composite panels and the like; the combination of a closed race having straight stretches, a plurality of carriages interconnected to form an endless train, means for advancing said train along said race, a stirrup-shaped carrying structure on each of said carriages, each carrying structure having vertically spaced apart, horizontal shanks rigidly connected together near the side of the carriage facing the center of said closed race, a fixed compression plate mounted on one of said shanks, a vertically movable compression plate mounted on the other of said shanks and facing said fixed compression plate, hydraulically operated jack means on each carriage for pressing the related movable plate towards the related fixed plate, lock means at the outer ends of said shanks for connecting together said outer ends to prevent spreading apart of said shanks under the reaction to movement of said movable plate toward the related fixed plate, actuating means along said straight stretches of said race to cause said lock means to connect together said outer ends of the shanks, a hydraulic pressure pump on at least one of said carriages, flexible conduits connecting said pump to said jack means of several of said carriages, a fluid flow reversing valve on each carriage interposed in the flexible conduits connecting the related jack means to said pump, and means along said straight stretches of said race for actuating the valves of the successive carriages so that said jack means of each carriage is operated to move the movable plate toward the fixed plate only when said lock means connects together the outer ends of the shanks of the related carriage.

References Cited in the file of this patent
UNITED STATES PATENTS

| | | |
|---|---|---|
| 1,577,744 | Gould | Mar. 23, 1926 |
| 1,873,818 | Burns | Aug. 23, 1932 |